March 8, 1960     K. G. HUTZENLAUB     2,927,476
ACCELERATOR CONTROL
Filed Jan. 23, 1956
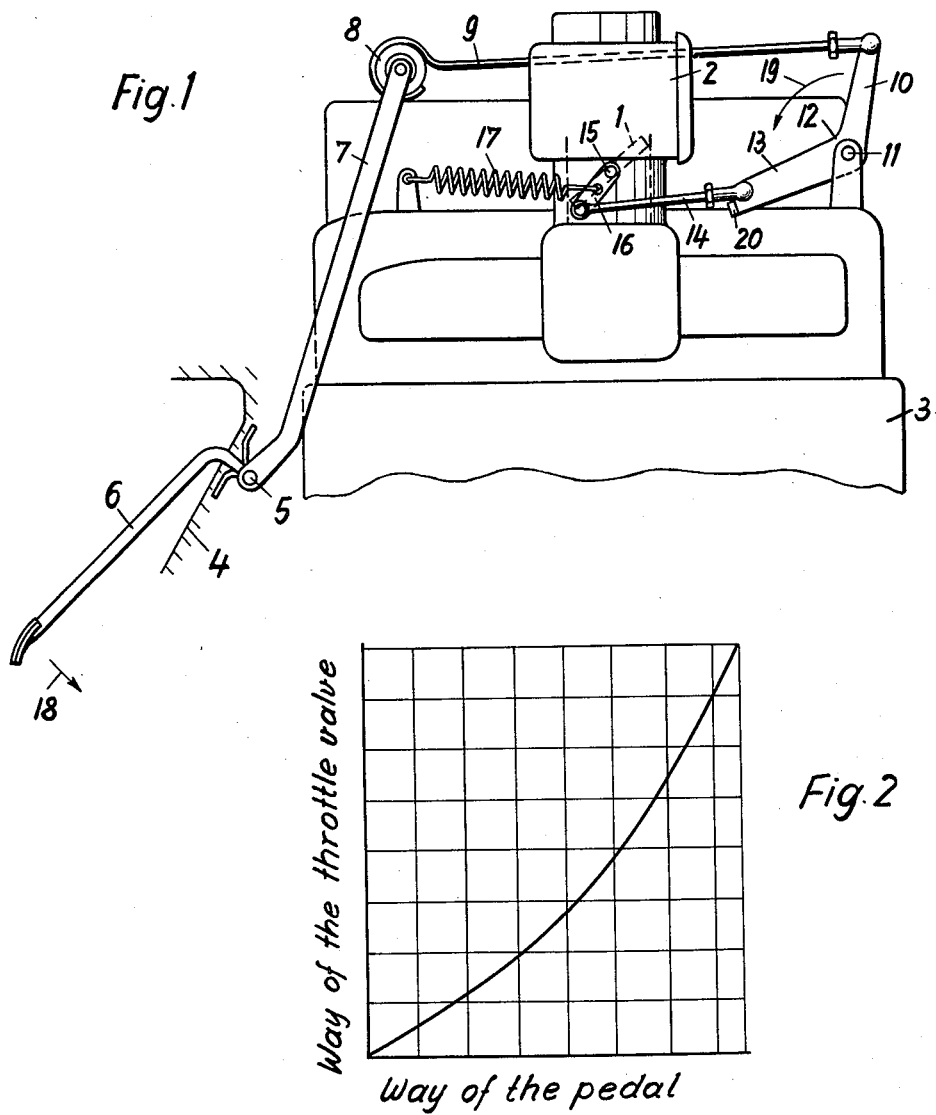
INVENTOR
KARL G. HUTZENLAUB
BY Dicke and Craig.
ATTORNEYS.

2,927,476

ACCELERATOR CONTROL

Karl G. Hutzenlaub, Stuttgart, Germany, assignor to Daimler-Benz Aktiengesellschaft, Stuttgart-Unterturkheim, Germany Application January 23, 1956, Serial No. 560,646

Claims priority, application Germany January 25, 1955

7 Claims. (Cl. 74—513)

The present invention relates to an improved mechanism for controlling the operation of an internal combustion engine, particularly of an automobile or similar vehicle.

It is an object of the present invention to provide a simple and inexpensive mechanism for controlling the operation of an automobile engine so that the adjustment of the accelerator thereof will not be as sensitive when the automobile is being driven at a lower speed as when it is driven at a higher speed.

More specifically, it is an object of the invention to provide a mechanism by means of which the earlier part of the opening movement of the accelerator for driving the automobile at a lower speed will require a relatively large depression of the accelerator pedal, while at a higher speed when the foot pedal is partly depressed, a more sensitive operation thereof will result in a more positive action upon the accelerator.

Another object of the present invention is to provide a system of levers for connecting the foot pedal with the accelerator shaft, and to provide these levers in such an asymmetrical arrangement relative to each other that equal angular movements of the foot pedal will be converted into differential angular movements of the accelerator.

Another feature of the invention consists in providing an accelerator foot pedal, which is preferably mounted on a shaft below the splashboard of the automobile and extends into the driver's compartment, with an extension which is connected to a lever which, in turn, is pivotally connected to one arm of a bell crank which is pivotally mounted on a bearing block on the cylinder head of the engine, while the other arm of such bell crank is pivotally connected by another rod to a lever which is rigidly secured to the accelerator shaft and normally held in an inoperative position by means of a spring.

Still another feature of the invention consists in providing that arm of the bell crank which is connected with the foot pedal so as to exert a decreasing leverage when the accelerator is being opened, while the other arm which is connected with the accelerator shaft at the same time exerts an increasing leverage.

Another object of the invention is to provide simple means for preventing the bell crank from attaining a dead-center position relative to the connecting rod which connects the bell crank with the operating lever on the accelerator shaft.

Further objects, features, and advantages of the present invention will appear from the following detailed description thereof, as well as from the accompanying drawings, in which—

Fig. 1 shows a side view of an automobile engine equipped with a lever mechanism according to the invention for controlling the accelerator of the engine; while Fig. 2 shows a diagram which illustrates the differential movement of the accelerator pedal relative to the accelerator shaft.

Referring to the drawings, the accelerator valve 1 within the intake opening of a carburetor 2 of an internal combustion engine 3 may be opened and closed by means of a foot pedal 6 which is mounted on a shaft 5 below the splashboard 4 of the automobile and extends to the inside of the driver's compartment. An extension 7 of pedal 6 carries a rubber sleeve 8, on the periphery of which a draw rod 9 engages, the other end of which is connected by a ball-and-socket connection with one arm 10 of a bell crank 12 which is pivotally mounted on a bearing block 11 on the cylinder head of the engine. The other arm 13 of bell crank 12 is connected by a rod 14 with a lever 16 which is rigidly secured to the accelerator shaft 15. A coil spring 17 tends to draw lever 16 to a position in which accelerator 1 closes the intake opening.

If in the operation of the automobile, foot pedal 6 is depressed in the direction as shown by the arrow 18, bell crank 12 will move in the direction shown by arrow 19. Bell crank 12 is made of asymmetrical shape so that when thus moved the leverage of arm 10 diminishes, while the leverage of arm 13 increases. Thus, as illustrated in Fig. 2, the movement of the foot pedal 6 will be in a nonlinear relation to the movement of the accelerator lever 16.

In order to prevent levers 13 and 14 from reaching a straight dead-center position, a stop 20 is preferably provided on the outer end of arm 13 of bell crank 12, and will abut against rod 14 when accelerator valve 1 is in the fully closed position.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In combination with an internal combustion engine having an accelerator valve including a valve shaft, means for pivoting said valve shaft for opening and closing said valve comprising a foot pedal, means for pivotally mounting said pedal, a system of levers for connecting said pedal with said valve shaft and comprising an extension rod on said pedal, a bell crank pivotally mounted on one end of the cylinder head of said engine, a connecting rod pivotally connected to one arm of said bell crank and resiliently mounted on the free end of said extension rod adjacent the other end of said cylinder head, an arm rigidly mounted on said valve shaft, a second connecting rod for pivotally connecting the other arm of said bell crank with the outer end of said arm on said valve shaft, and a spring connected to said last arm for normally maintaining said valve in its closed position, said levers being asymmetrically disposed relative to each other so that equal angular movements of said pedal will be converted into differential movements of said valve, said levers being disposed relative to each other so that when said pedal is being depressed to open said valve, the leverage of the arm of said bell crank which is connected with said pedal diminishes, while the leverage of the other arm of said bell crank which is connected with said valve increases.

2. In a combination as defined in claim 1, wherein the arm of said bell crank which is pivotally connected with said second connecting rod is provided at its end with a stop adapted to engage with said connecting rod to prevent said arm and connecting rod from reaching a straight dead-center position relative to each other.

3. A lever-linkage adapted for actuation of a member to be rotated and having a shaft, said lever-linkage comprising an arm on said shaft, a pivotally mounted bell crank lever, a first rod connecting one arm of said bell crank lever with said arm on said shaft, a foot pedal having an extension rod, pivot means common to said foot pedal and said extension rod, a second rod having a first pivotal connection to said extension rod and a second pivotal connection to the other arm of said bell crank lever, the arms of said bell crank lever being asymmetrically disposed relatively to each other so that equal angular movements of said foot pedal will be converted into differential movements of said shaft, the leverage of said one arm of said bell crank lever being diminished and the leverage of said other arm being increased upon movement of said foot pedal in one direction.

4. A lever-linkage according to claim 3, wherein spring means is provided for urging said arm on said shaft in one rotative direction and wherein said second pivotal connection comprises resilient means.

5. A lever-linkage according to claim 4, wherein said one arm of said bell crank lever and said first rod further comprise means for preventing said one arm and said first rod from reaching a dead-center position relative to each other.

6. A lever-linkage according to claim 5, wherein said last-named means comprises a stop member on said one arm of said bell crank lever.

7. A lever-linkage adapted for actuation of a member to be rotated and having a shaft, said lever-linkage comprising an arm on said shaft, a bell crank lever having arms asymmetrically disposed relative to one another, pivot means for said bell crank lever, a first rod pivotally connected to said arm and to one of said arms of said bell crank lever, the longitudinal axis of said first rod extending transversely of the axis of said pivot means at a first distance therefrom in a first position of said bell crank lever, a pivotally mounted foot pedal having an extension rod, a second rod pivotally connected to said extension rod and to the other arm of said bell crank lever, the longitudinal axis of said second rod extending transversely of the axis of said pivot means at a second distance therefrom in said first position of said bell crank lever, a depression of said foot pedal causing the turning of said bell crank lever about said pivot means into a second position in which said first distance is increased and in which said second distance is diminished.

References Cited in the file of this patent

UNITED STATES PATENTS

| | | |
|---|---|---|
| 1,438,369 | Esnault-Pelterie | Dec. 12, 1922 |
| 2,332,122 | Vaughn | Oct. 19, 1943 |
| 2,513,439 | Ainsworth | July 4, 1950 |
| 2,622,575 | Stump | Dec. 23, 1952 |
| 2,661,941 | Smith | Dec. 8, 1953 |
| 2,664,958 | Dancik | Jan. 5, 1954 |